United States Patent [19]
Premo

[11] 3,880,752
[45] Apr. 29, 1975

[54] METHOD OF TREATING WATER CONTAINED IN GASOLINE STORAGE TANKS

[75] Inventor: John G. Premo, Western Springs, Ill.

[73] Assignee: Nalco Chemical Company, Chicago, Ill.

[22] Filed: Mar. 20, 1974

[21] Appl. No.: 452,854

[52] U.S. Cl. ............... 210/54; 210/59; 208/188
[51] Int. Cl. .............................................. B01d 17/00
[58] Field of Search ....... 208/187, 188; 210/53, 54, 210/59; 252/316; 260/29.6 H, 674 R

[56] References Cited
UNITED STATES PATENTS

| | | | |
|---|---|---|---|
| 3,171,805 | 3/1965 | Suen et al. ........................... | 210/54 |
| 3,259,570 | 7/1966 | Priesing et al. ..................... | 210/54 X |
| 3,417,013 | 12/1968 | Roberts ............................. | 208/188 X |
| 3,418,237 | 12/1968 | Booth et al. ......................... | 210/54 |
| 3,438,892 | 4/1969 | Wymore et al. .................. | 208/188 X |
| 3,583,904 | 6/1971 | Winston et al. ..................... | 208/188 |
| 3,624,019 | 11/1971 | Anderson et al. ............. | 260/29.6 H |

OTHER PUBLICATIONS

Chemistry of acrylamide, American Cyanamid Co., 1969, pages 36 and 45.

*Primary Examiner*—Charles N. Hart
*Assistant Examiner*—Robert H. Spitzer
*Attorney, Agent, or Firm*—John G. Premo; Robert A. Miller

[57] ABSTRACT

Water contained in storage tanks of the type used in gasoline filling stations to store gasoline is prevented from being pumped with the gasoline by treating such water with a water-soluble polymer in an amount sufficient to substantially increase its viscosity to a point whereby it is incapable of being pumped.

5 Claims, No Drawings

METHOD OF TREATING WATER CONTAINED IN GASOLINE STORAGE TANKS

INTRODUCTION

The present gasoline shortage has brought about a problem that affects many motorists throughout the world. It is common practice for gasoline filling stations to store gasoline in underground storage tanks. These tanks are of rather small capacity, e.g. several thousand gallons. They are intermittently filled from large tank trucks which pump various grades of gasoline into these tanks. The tanks are connected by suitable piping means to the service station pump that pumps the gasoline from the tank into the automobile or truck gasoline tank.

For various reasons water, which is either, entrained in the gasoline, is formed by condensation in partially emptied tanks or enters the tanks due to pinhole leaks in the tank itself cause a certain volume of water to accumulate in these tanks. This water is not pure and frequently is contaminated with large amounts of suspended matter such as, inorganic oxides, silt and other solid impurities. It is customary to cause the siphon end of the pump which is located near the bottom of the tank to be positioned a sufficient distance above the normal water level of the tank to insure that water will not be inadvertently pumped along with the gasoline. In these times of gasoline shortages, service station operators have lowered the siphon tube of the pump so that it is just above the water. Frequently additional water accumulates in the tank and when the tank is nearly empty of gasoline, water is thereby pumped along with gasoline into the gasoline tank of a car or truck.

When this water contaminated gasoline enters the gasoline tank of a car or truck and goes through the fuel line, fuel pump and carburetor of a car, it does untold damage to the car since the sediment tends to plug the fuel line and in many instances damages the carburetor beyond repair. When water contaminated gasoline is pumped into an automotive gasoline tank it requires complete rebuilding of the carburetor, carburetor cleaning or carburetor replacement. Also, fuel lines must be flushed and in many instances the gasoline tank must be removed from the car and a new one provided before the automobile or truck is serviceable again.

While it is important for service station operators to pump nearly all of the gasoline from their storage tanks in order to render maximum service to their customers, at the time it is important that the water contained in such tanks be prevented from being pumped along with the gasoline into gasoline tanks of cars and trucks.

THE INVENTION

In accordance with the invention there is provided a method for preventing water contained in small storage tanks of the type used in gasoline filling stations to store gasoline from being pumped from such tanks along with gasoline which comprises adding to such water a water-soluble polymer in an amount sufficient to substantially increase the viscosity of the water to a point whereby it is incapable of being pumped.

In practice, the water-soluble polymer is admixed with the water in the storage tank and allowed to dissolve therein. The amount of polymer required to produce a highly viscous nonpumpable aqueous fluid will depend upon the type of polymer, its chemical structure and molecular weight. A variety of water soluble polymers may be used in the practice of the invention although in a preferred practice and from a standpoint of commercial availability and utility it is preferred that water-soluble vinyl addition polymers or copolymers be used.

THE WATER-SOLUBLE POLYMERS

As indicated, a variety of water-soluble polymers may be employed in the practice of the invention. Thus gums, condensation polymers, water-soluble vinyl addition polymers, high molecular weight ethylene oxide polymers and the like may all be used advantageously.

In a preferred practice of my invention I prefer to use water-soluble vinyl addition polymers or copolymers. When such polymers are used I prefer that their molecular weight be 1 million or more. When such polymers are employed it is possible to form very viscous solutions with water at a concentration ranging from about 1% up to 3%. Again the exact concentration will vary depending upon the particular polymer or copolymer employed as well as its molecular weight.

A convenient form of the water-soluble vinyl addition polymers for use in the practice of the invention resides in water-soluble vinyl addition polymers that are in the form of a water-in-oil emulsion. More specifically, the present invention contemplates using a water-in-oil emulsion which contains dispersed therein finely divided particles of a water-soluble vinyl addition polymer. These polymer systems may be inverted in water to allow easy dissolution of the polymer in water. See U.S. Pat. No. 3,734,873 the disclosure of which is incorporated herein by reference. The particular water soluble vinyl addition polymers that may be used in the form of water-in-oil emulsions are discussed below.

THE WATER-SOLUBLE VINYL ADDITION POLYMERS

These polymers are well-known to the art and have been described in numerous publications and patents. The polymers most commonly used commercially are acrylamide polymers which include polyacrylamide and its water-soluble copolymeric derivatives such as, for instance, acrylamideacrylic acid, and acrylamide-acrylic acid salt copolymers which contain from about 95–5% by weight of acrylamide. Also useful are copolymers of acrylamide with other vinyl monomers such as maleic anhydride, acrylonitrile, styrene and the like. It is preferred in the practice of this invention to use acrylamide polymers which are water-soluble and which contain at least 5% by weight of acrylamide.

Other water-soluble vinyl polymers are described in detail in U.S. Pat. Nos. 3,418,237, 3,259,570 and 3,171,805.

In examining the disclosures of these patents it will be seen that the water-soluble polymers may be either cationic or anionic and, in some instances, the ionic charges are sufficiently slight so that the polymers may be considered as nonionic.

For example, water-soluble polymers and copolymers of allyl, diallyl amines, or dimethylaminoethylmethacrylate are cationic. Polymers such as polyvinyl alcohol are nonionic, and polymers such as polyacrylic acid or polystyrene sulfonates are anionic. All of these polymers may be used in the practice of the invention.

The molecular weight of the polymers described above may vary over a wide range, e.g. 10,000–25,000,000. Polymers having higher molecular weights are more difficulty dissolved in water and tend to form extremely viscous solutions at relatively low concentrations. These polymers may be produced by any known methods of conducting polymerization reactions. Thus, solution suspension or emulsion polymerization techniques may be used. The gums are well-known water-soluble polymers and are described in vol. 10 of the Encyclopedia of Chemical Technology, 2nd edition, Interscience Publishers, 1966.

These polymers when in the form of water-in-oil emulsions are capable of rapidly producing aqueous solutions of the water-soluble vinyl addition polymers or gums having concentrations within the range of 0.1–20% by weight.

THE WATER-IN-OIL EMULSIONS

The water-in-oil emulsions may be prepared by any number of known techniques. The oils used in preparing these emulsions may be selected from a large group of organic liquids which include liquid hydrocarbons and substituted liquid hydrocarbons.

A preferred group of organic liquids are the hydrocarbon liquids which include both aromatic and aliphatic compounds. Thus, such organic hydrocarbon liquids as benzene, xylene, toluene, mineral oil, kerosenes, naphthas and, in certain instances petrolatums may be used, aliphatic hydrocarbon oils are preferred. A particularly useful oil from the standpoint of its physical and chemical properties is the branch-chain isoparaffinic solvent sold by Humble Oil & Refining Company under the trade name "Isopar M." Typical specifications of this narrow-cut isoparaffinic solvent are set forth below in Table I:

the emulsion be a stable emulsion and to achieve this end it is often necessary to employ an oil-soluble emulsifying agent. The amount of emulsifying agent to provide an emulsion will have to be determined by routine experimentation. As a general rule it may be said that the amount of oil-soluble emulsifier may range from 0.1 to 30% by weight based on the weight of the oil. To produce stable emulsions the amount of emulsifier will normally be within the range of 12–20% by weight of the oil.

Rather than provide a listing of suitable emulsifiers, we prefer to generally recommend as being satisfactory the so-called low HLB materials which are well documented in the literature and are summarized in the Atlas HLB Surfactant Selector. Although these emulsifiers are useful in producing good water-in-oil emulsions, other surfactants may be used as long as they are capable of producing these emulsions. For instance, we have found that certain high HLB surfactants are capable of producing stable water-in-oil emulsions. A typical low HLB emulsifier is sorbitan monooleate.

DISPERSING THE POLYMERS INTO THE WATER-IN-OIL EMULSIONS

The water-soluble vinyl addition polymers or the gums are dispersed into the water-in-oil emulsion. The polymers as produced by most manufacturing processes are in the form of powders or lump-like agglomerates of varying particle size. It is desirable that the particles, before being placed into the emulsion, be comminuted by grinding, abrading or the like so that their average particle size is less than 5 millimeters and preferably is within the range of 1–5 microns. After the powders have been comminuted, they may be dispersed into the water-in-oil emulsion by means of agita-

TABLE I

| Specification properties | Minimum | Maximum | Test method |
|---|---|---|---|
| Gravity, API at 60/60 F | 48.0 | 51.0 | ASTM D 287. |
| Color, Saybolt | 30 | | ASTM D 156. |
| Aniline point, F | 185 | | ASTM D 611. |
| Sulfur, p.p.m. | | 10 | ASTM D 1266 (nephelometric mod.). |
| Distillation, F: | | | |
| IBP | 400 | 410 | |
| Dry Point | | 495 | ASTM D 86. |
| Flash Point, F. (Pensky-Martens closed cup). | 160 | | ASTM D 93. |

The amount of oil used in relation to the water to prepare the emulsion may be varied over wide ranges. As a general rule, the amount of oil-to-water may vary between 5:1–1:10 with preferable emulsions being prepared in the ratio of 1:2 to 1:10. These ratios are illustrative of emulsions that can be prepared, although it should be understood that the invention is not limited thereby.

The emulsions may be prepared by any number of techniques. For example, the emulsions may be prepared by using high speed agitation or ultrasonic techniques. In most instances, however, it is desirable that tion provided by such devices as stirrers, shakers, homogenizers and the like. To be commercially practical, the amount of polymer in the emulsion should be at least 2% by weight. The invention contemplates using emulsions containing between 5–75% by weight with preferred emulsions having a polymer concentration within the range of 10–45% by weight. In some cases the starting emulsions are converted to suspensions due to the nature and the amount of the polymer present therein.

The method of preparing a water-in-oil emulsion by the use of a homogenization device is quite simple.

Water is added with agitation to an oil-emulsifier mixture to make an emulsion. The finely divided polymer particles are then added to the emulsion with rapid agitation. The particle size of the polymer should be within the range of 1 micron to about 5 microns. This suspension of polymer particles in the emulsion is passed through a homogenizer. The amount of pressure necessary to produce a smooth emulsion varies in each experiment. The minimum pressure requirement is a function of the abrasiveness of the polymer, the concentration of the polymer, and the particle size of the polymer. In general, the pressure requirement is between 1000–3000 p.s.i. However, depending upon those variable listed, the pressure requirement could be lower or exceed the stated range. A typical homogenizer device is the Manton-Gaulin type.

From a commercial standpoint it is beneficial that the polymer emulsions thus described be stable, yet at the same time contain relatively large amounts of polymers. One method of insuring that the polymers do not precipitate when dispersed in the emulsion is that the particle size of the polymer be as small as possible. Thus polymers dispersed in the emulsifiers are quite stable when the particle size is within the range of 5 millimicrons up to about 5 microns. To produce particle sizes within these limitations, spray dryers with appropriate size nozzles may be used. It also is possible to prepared the polymer-containing emulsion of the water-soluble vinyl addition polymers directly from the vinyl monomers from which these polymers are synthesized. Such polymer-containing emulsion may be synthesized by using the water-in-oil-emulsion polymerization technique set forth in U.S. Pat. No. 3,284,393. The teachings of this patent comprise forming a water-in-oil emulsion of water-soluble ethylenic unsaturated monomers. The emulsion is formed by utilizing a water-in-oil emulsifying agent. To this monomer is added a free radical-type polymerization catalyst and then heat is applied under free radical-forming conditions to form water-soluble polymer latices.

INVERTING THE EMULSION

When the polymer-containing emulsions of the type described are inverted in the pressure of water the polymer rapidly goes into solution. The polymer-containing emulsions release the polymer in the water in a very short period of time when compared to the amount of time required to dissolve a solid form of the polymer.

The polymer-containing emulsions may be inverted by any number of means. The most convenient means resides in the use of a surfactant added to either the polymer-containing emulsion or to the water into which it is to be dissolved. The placement of a surfactant into the water causes the emulsion to rapidly invert and release the polymer in the form of an aqueous solution. When this technique is used to invert the polymer-containing emulsion the amount of surfactant present in the water may vary over a range of 0.01 to 50% based on polymer. Good inversion often occurs within the range of 1.0–10% based on the polymer.

THE SURFACTANTS

The preferred surfactants are hydrophilic and are further characterized as being water-soluble. Any hydrophilic-type surfactant such as thoxylated nonyl phenols, ethoxylated noyl phenol formaldehyde resin, di-octyl esters of sodium sulfosuccinate, and octyl phenol polyethoxy ethanol can be used.

Other surfactants that may be employed include the soaps such as sodium and potassium myristate, laurate, palmitate, oleate, stearate, resinate, and hydroabietate, the alkali metal alkyl or alkylene sulfates, such as sodium lauryl sulfate, potassium stearyl sulfate, the alkali metal alkyl or alkylene sulfonates, such as sodium lauryl sulfonate, potassium stearyl sulfonate, and sodium cetyl sulfonate, sulfonated mineral oil, as well as the ammonium salts thereof; and salts of high means like lauryl amine hydrochloride, and stearyl amine hydrobromide.

Any anionic, cationic, or nonionic compound can be used as the surfactant. Examples of suitable anionic surfactants are alkali metal, ammonium and amine soaps; the fatty acid part of such soaps contains preferably at least 16 carbon atoms because soaps based on lauric and myristic acids have a great tendency to develop abundant foam. Following is a list of suitable surfactants that could be used in the practice of this invention. Any water-soluble surfactant could be used, but naturally some are more efficient than others. Useful surfactants include, but are not limited to: polyoxyethylene alkyl phenol, polyoxyethylene (10 mole) cetyl ether, polyoxyethylene alkylaryl ether, polyoxyethylene monolaurate, polyoxyethylene vegetable oil, polyoxyethylene sorbitan monolaurate, polyoxyethylene esters or mixed fatty and resin acids, polyoxyethylene sorbitol lanolin dirivative; polyoxyethylene (12 mole) tridecyl ether, polyoxyethylene sorbitan esters of mixed fatty and resin acids, polyoxyethylene sorbitan monostearate, polyoxyethylene sorbitan monooleate, polyoxyethylene monostearate, polyoxyethylene (20 mole) stearyl ether, polyoxyethylene (20 mole) oleyl ether, polyoxyethylene (15 mole) tridecyl ether, polyoxyethylene fatty alcohol, polyoxyethylene alkyl amine, polyoxyethylene glycol monopalmitate, polyoxyethylene sorbitan monopalmitate, polyoxyethylene (20 mole) cetyl ether, polyoxyethylene oxypropylene stearate, polyoxyethylene lauryl ether, polyoxyethylene lanolin derivative, sodium oleate, quaternary ammonium derivative, potassium oleate, N-cetyl N-ethyl morpholinium ethosulfate, and pure sodium lauryl sulfate.

In addition to using the water-soluble surfactants described above, other surfactants may be used such as silicones, clays and the like which are included as surfactants since, in certain instances, they tend to invert the emulsion even though they are not water-soluble.

In other specific cases the surfactant may be directly added to the polymer-containing emulsion; thereby rendering it self-inverting upon contact with water. These products, while capable of being used in certain systems, must be carefully formulated since the surfactants may tend to interact with the emulsifier or the emulsion and destroy it prior to its being used.

Other techniques for inverting the emulsions include the use of agitation, high voltage electrical fields, heat and pH shift, as well as the placement into the water, into which the polymer-containg emulsion is to be dissolved, certain electrolytes. For any particular polymer containing emulsion a suitable method for its inversion may be readily determined by routine experimentation.

EXAMPLES

To illustrate typical emulsions the following examples are set forth below in Table II.

TABLE II

| EXAMPLE No. | WATER (% by Wt.) | OIL (% by Wt.) | POLYMER | % In EMULSION | POLYMER PARTICLE Size Range | INVERSION METHOD | DISSOLUTION TIME |
|---|---|---|---|---|---|---|---|
| 1 | 72 | 28 (I) | 93% acrylamide<br>7% methacrylic acid | 35 | 5–70 microns | 2[2] | <5 min. |
| 2 | 72 | 28 (I) | 93% acrylamide<br>7% methacrylic acid | 35 | 5–70 microns | 3[3] | 30–45 min. |
| 3 | 72 | 28 (T) | 70% acrylamide<br>30% acrylic acid | 35 | 5–70 microns | 2[1] | <5 min. |
| 4 | 72 | 28 (T) | Acrylamide | 35 | 5–70 microns | 2[1] | <5 min. |
| 5 | 67 | 33 (I) | 93% acrylamide<br>7% methacrylic acid | 32 | <30 microns | 1[2] | 5–10 min. |
| 6 | 67 | 33 (I) | 75% acrylamide<br>25% DMAEM | 30 | <30 microns | 1[2] | 5–10 min. |
| 7 | 67 | 33 (T) | Acrylamide | 35 | 10 microns–1 mm. | 1[2] | 5–10 min. |
| 8 | 50 | 50 (I) | 70% acrylamide<br>30% acrylic acid | 34 | 10 microns–1 mm. | 1[2] | Immediate |
| 9 | 48 | 52 (I) | Sodium polyacrylate | 37 | <1 mm. | 1[1] | <15 min. |
| 10 | 23 | 67 (I) | Acrylamide (Dry Solids into Emulsion) | 23 | 10 microns–1 mm. | 1[1] | <1 hour |
| 11 | 42 | 58 (I) | DMAEM | 24 | <30 microns | 1[1] | <5 min. |
| 12 | 42 | 58 (I) | Polystyrene sulfonate | 24 | <30 microns | 1[1] | <5 min. |

I = Isopar M
T = Toluene
DMAEM = Dimethyl Aminoethyl Methacrylate
1 — Surfactant added to water
2 — Surfactant added to emulsion
3 — Agitation without surfactant
[1]—Octyl phenol Rx with 3 moles of EtO
[2]—Octyl phenol Rx with 10 moles of EtO
[3]—Complex organic phosphate ester A variety of emulsions were prepared containing different water-soluble vinyl addition polymers. The emulsions were then inverted using different techniques. Inversion Method No. 1 was the placement of a surfactant into the water into which the polymer was to be dissolved. Inversion Method No. 2 incorporated the surfactant into the emulsion. Inversion Method No. 3 was agitation without the presence of surfactant. The amount of surfactant in relation to water into which the polymer was dissolved varied between 1–5% by weight.

As indicated, the water-in-oil emulsions which contain the water-soluble vinyl addition polymers are easily inverted by incorporating therewith or into the water to which they are to be added a suitable surfactant. A convenient method of feeding these water-in-oil emulsions is to add them directly to the gasoline at the refinery level or at the distribution level where the gasoline is transported by large tank trucks to service stations. Since the water-in-oil emulsions which contain polymers are completely compatible with gasoline they may be readily incorporated thereinto in amounts ranging from between 2% to 10% by weight without substantially increasing the density of the gasoline or interfering with its transportation or pumping. When the tank truck comes to a gas station the gasoline containing the water-in-oil emulsion polymer system would be pumped into the storage tank which had water contained therein. The pumping action would break the emulsion and release the polymer into the water. The agitation caused by the pumping would cause the polymer to dissolve and substantially thicken the water to a point whereby it comes a viscous gel-like mass. Once the water was gelled and the gasoline was nearly pumped out of the tank, the water would tend to remain in place and would not be pumped with the gasoline thus preventing contamination of the gasoline with such water.

As time went on in any treated tank additional water would form. To prevent this water from being pumped additional minor amounts of polymer would be added to the water to thicken the gel on this additionally accumulated water.

EXAMPLE 13

To illustrate the invention the following is presented by way of illustration. In a typical operation a gasoline tank truck would be filled with gasoline which contained 5% by weight of a copolymer comprising 70% acrylamide and 30% acrylic acid having a molecular weight of about 6,000,000. This polymer would be in the form of a water-in-oil emulsion which contained approximately 33% Isopar, 33% water and 33% oil. The gasoline truck would then drive to a service station needing gas and the contents or a portion thereof would be pumped into the service station storage tank located beneath the ground. The pumping of the gasoline would cause good agitation thereby allowing contact of the water in the tank with the water-in-oil emulsion which contained the polymer. Previous to the pumping the service station operator would have added approximately 1% by weight of nonylphenol reacted with 9 moles of ethylene oxide or a commercial detergent to the water contained in the tank. As the gasoline contacted the water the emulsion would invert releasing polymer into the water. The amount of polymer contained in the water would approach about 3% by weight and could be adjusted depending upon the amount of water estimated to be in the tank. After several days' normal operation the water would gradually turn into a thick viscous gel-like material. As the gasoline floating on top of the gel-like mass would be nearly pumped from the tank the screen siphon connected onto the pump which is located near this interface would not be capable of pumping the gel, thereby preventing the contaminated water contained in the tank from mixing with the gasoline.

Having thus described my invention it is claimed as follows:

1. A method for preventing water contained in storage tanks of the type used by gasoline filling stations to store gasoline from being pumped from said tanks along with gasoline which comprises adding to said water a water-soluble polymer in an amount sufficient to substantially increase the viscosity of the water to a point whereby it is incapable of being pumped.

2. The method of claim 1 where the water-soluble polymer is a water-soluble vinyl addition polymer having a molecular weight of at least 1 million.

3. The method of claim 2 where the water-soluble vinyl addition polymer is uniformly dispersed throughout a water-in-oil emulsion prior to being added to the water in the gasoline storage tank.

4. The method of claim 3 where the water-soluble vinyl addition polymer is an acrylamide polymer.

5. The method of claiim 4 where the acrylamide polymer is a copolymer of acrylamide and acrylic acid.

* * * * *